July 27, 1926.

J. E. KOBERNIK

PROCESS OF TREATING HYDROCARBON GASES

Filed Oct. 27, 1925     3 Sheets-Sheet 2

1,594,014

Inventor:
Julius E. Kobernik
by Hazard and Miller
Attorneys

July 27, 1926.
J. E. KOBERNIK
1,594,014
PROCESS OF TREATING HYDROCARBON GASES
Filed Oct. 27, 1925   3 Sheets-Sheet 3
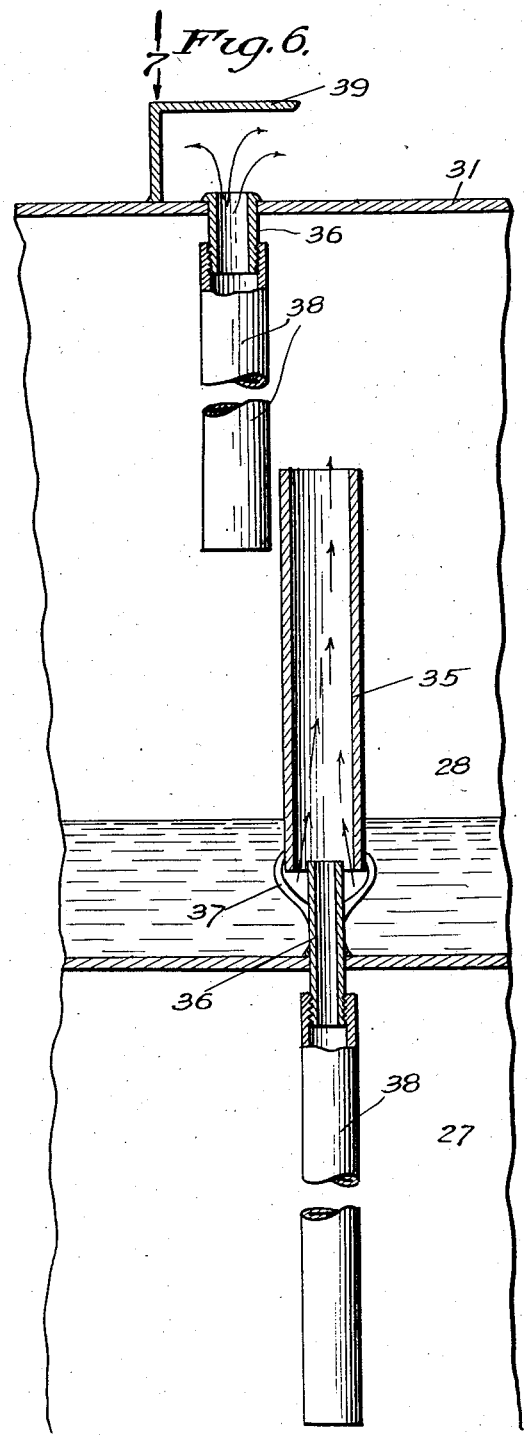
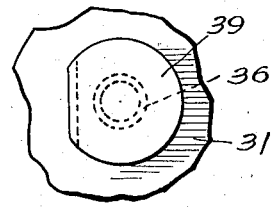
Inventor:
Julius E. Kobernik
by Hazard and Miller
Attorneys Patented July 27, 1926.

1,594,014

UNITED STATES PATENT OFFICE.

JULIUS E. KOBERNIK, OF FULLERTON, CALIFORNIA, ASSIGNOR TO NEWTON PROCESS MANUFACTURING CO., OF FULLERTON, CALIFORNIA, A CORPORATION OF CALIFORNIA.

PROCESS OF TREATING HYDROCARBON GASES.

Application filed October 27, 1925. Serial No. 65,100.

My invention relates to a process of distilling and blending hydrocarbons, and especially to the treatment of so-called lean gases derived either from oil wells or other sources which have been previously treated to separate the absorbable or condensable light hydrocarbons for a motor fuel.

It is an object of the present invention to provide a process whereby such lean gases which contain hydrocarbons which are not absorbable or condensable by ordinary methods may be blended and distilled to yield a portion of condensable hydrocarbons which are recovered in the form of a commercial stabilized gasoline.

It is another object of this invention to cause an intimate contact of the lean gases and an absorbing medium, in two stages.

In this first treatment both the gas and the absorbing medium are preheated and the gas acts as an absorbent and causes the volatilization of a part of the absorbing hydrocarbon medium.

In the second treatment the gas now charged with the vapors of hydrocarbons derived from the absorbing medium are cooled and caused to contact intimately with the cold absorbing medium where the latter absorbs the vapors and a portion of the gas. The enriched or so-called fat absorbing medium is now conveyed to a suitable still and the absorbed hydrocarbons are distilled off and condensed.

With the above and other objects in view, my invention consists in the steps of the process hereinafter described and claimed.

Figure 1:
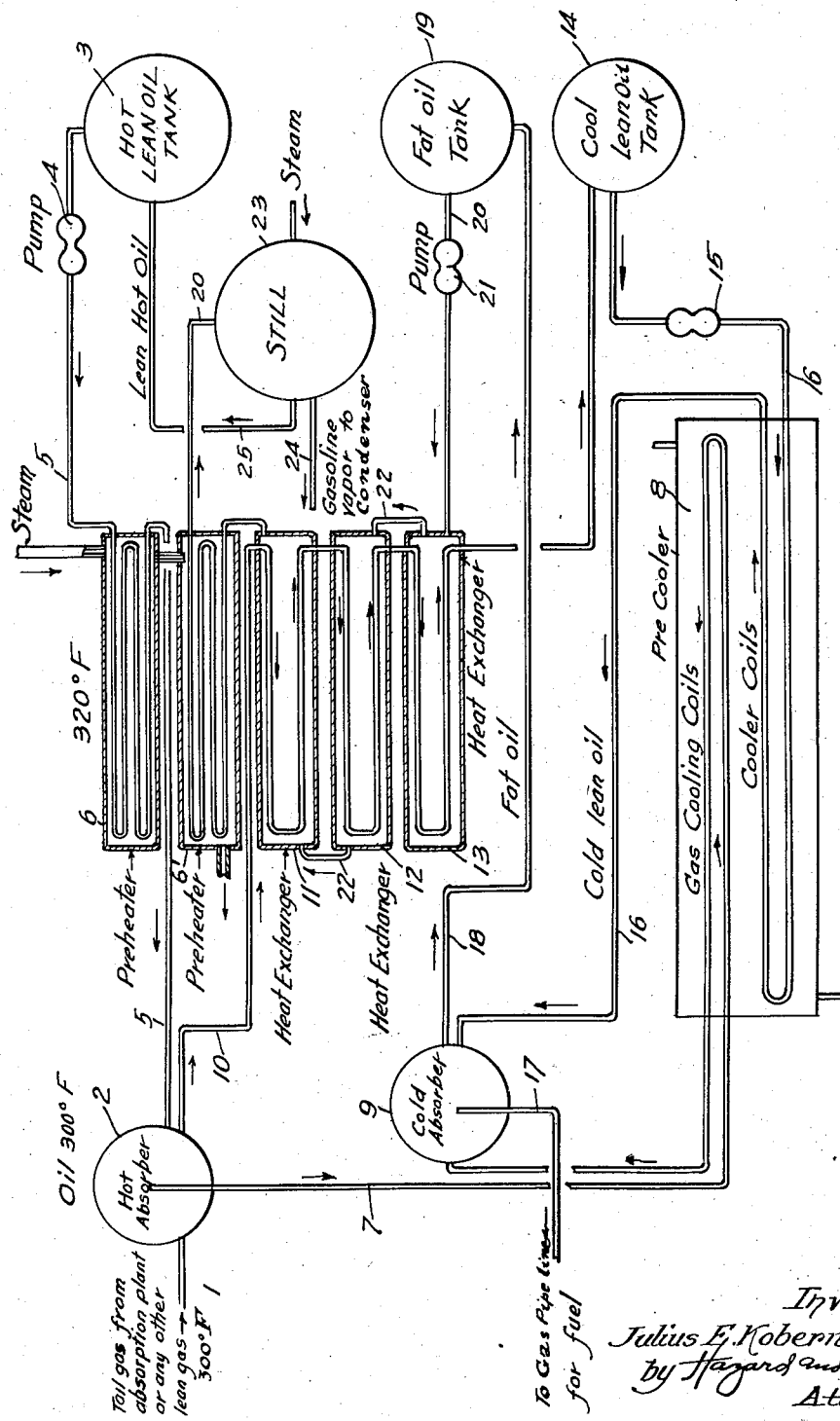
Figure 2:
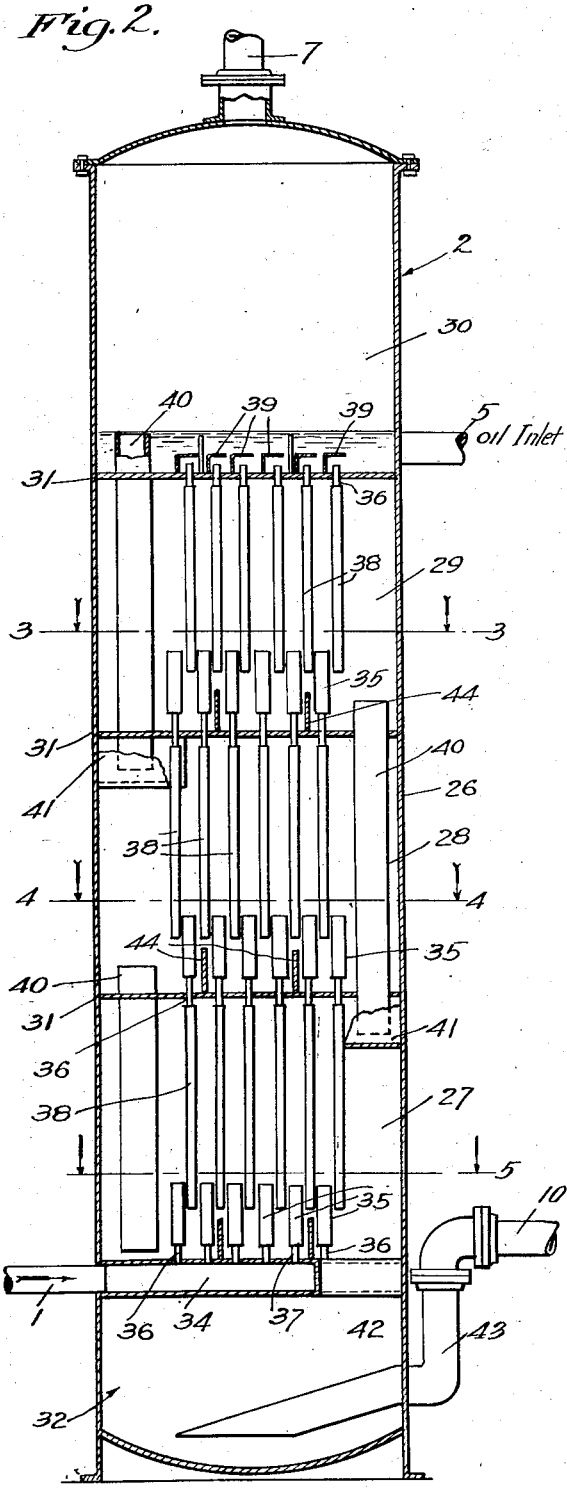
Figure 3:
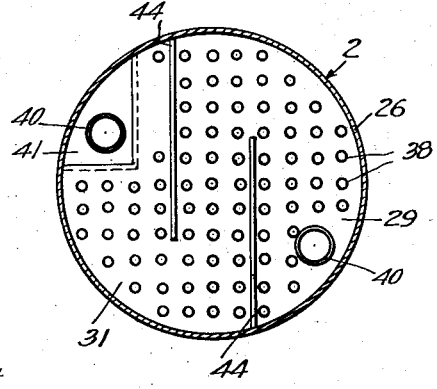
Figure 4:
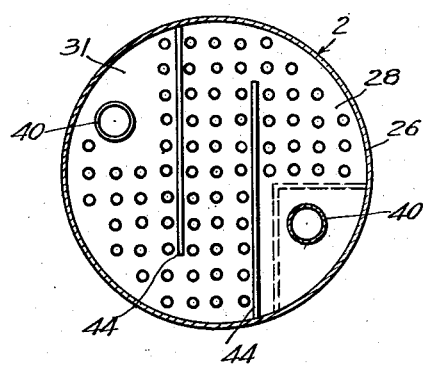
Figure 5:
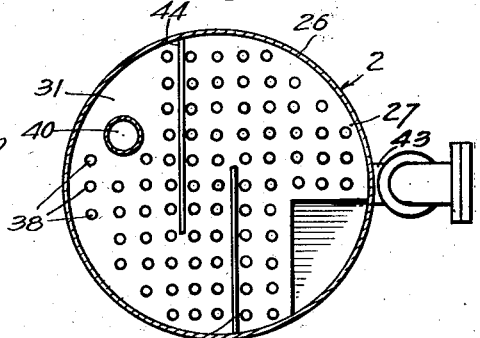

In the accompanying drawings I have shown an apparatus suitable for carrying out my process, in which—
Figure 1 is a view showing in diagram a complete apparatus suitable for my process;

Fig. 2 is a vertical cross section of an absorber;

Figs. 3, 4 and 5 are horizontal cross sections taken on lines 3—3, 4—4 and 5—5 of Fig. 2 respectively;

Fig. 6 is a detailed view showing the reaction tubes in one of the chambers of the absorber of Fig. 2;
Fig. 7 is a detailed view of a baffle.

Referring to Figure 1 of the drawings, 1 indicates a supply pipe conveying tail gas from the absorption plant or any other lean gas to an absorption tower, 2, which, to distinguish from another absorption tower will be called hereafter the hot absorber, where the lean gas is caused to come in intimate contact with an absorbing medium. This medium may be kerosene or heavier mineral oil distillates, known as mineral seal oil in the trade, or hydrocarbons of still greater specific gravity. The absorbing medium, which for the sake of convenience will be called oil hereafter, is pumped from the hot lean oil tank 3 by means of pump 4 through a pipe line 5 which passes through a steam preheater 6 and enters the hot absorber 2. The gas passes from hot absorber 2 through a pipe 7 through a precooler 8 and enters the cold absorber 9, where the gas is intimately mixed with the oil, which, leaving the hot absorber 2 through pipe 10, passes through a series of heat exchangers 11, 12 and 13 to a cool lean oil tank 14, whence it is pumped by means of pump 15 and pipe line 16 passing through the pre-cooler 8 to the cold absorber 9, where the cold oil absorbs the vapors contained in the lean gas as well as a part of the gas itself. The unabsorbed gas leaves the cold absorber 9 by pipe 17 to storage tanks or places of consumption, not shown.

The oil charged with the hydrocarbons just mentioned leaves the cold absorber 9 by pipe line 18, passes to fat oil tank 19, thence through the pipe line 20 and pump 21 where it is pumped successively through heat exchangers 13, 12 and 11, which are connected by means of pipe connections 22. The fat oil, in passing through the heat exchangers 13, 12 and 11, will cool the hot lean oil passing through pipe 10 disposed in said heat exchangers, and in doing so, will itself become heated. Pipe 20 after passing through preheater 6' leads to a still 23 of any suitable construction where the absorbed and blended hydrocarbons are distilled off and pass through pipe 24 to a suitable condenser, not shown. The lean hot oil passes from the still 23 by pipe 25 to the hot lean oil tank 3.

I use a special construction of an absorber shown in Figs. 2 to 7 inclusive. The hot absorber 2, shown in Fig. 2, consists of a cylindrical shell 26 closed at the top and at the bottom and divided by means of horizontal partitions 31 into a series of reaction chambers, there being four shown in Fig. 2, 27, 28, 29 and 30. Below the reaction chamber 27 is an oil collecting chamber 32. The gas enters the hot absorber 2 by means of pipe 1 by a substantially circular chamber 34, and passes upwardly through a series of vertical reaction tubes 35, disposed above smaller jet tubes 36. Brackets 37 on jet tubes 36 hold the reaction tubes 35 in position (see Fig. 6). It will be noted that the lower end of reaction tube 35 extends slightly below the top of jet tube 36. The gas passes from chamber 27 through vertical drop tubes 38, which connect to jet tubes 36 which extend into the chamber 28 immediately above, into a series of reaction tubes 35, and in a like manner from chamber 28 to 29. In the top chamber 30 the jet tubes 36 project through the partition 31 and in place of reaction tubes 35 horizontal baffle plates 39 are disposed above jet tubes 36. A gas outlet pipe 7 leads from the top of shell 26.

The oil enters the shell 26 by means of oil inlet pipe 5. A constant level of oil is maintained in each of the chambers 30, 29, 28 and 27, by means of an overflow pipe 40 leading from chamber 30 to chamber 29. A small oil seal chamber 41 is provided, into which the lower end of overflow pipe 40 projects, such oil seal chamber 41 extending at a slight distance below the partition 31. A similar overflow pipe 40 leads from chamber 29 to chamber 28. The overflow pipe 40 leading from chamber 28 to chamber 27 has its lower end spaced slightly from the gas chamber 34, there being an opening 42 in the gas chamber 34 leading from the reaction chamber 27 to the oil collecting chamber 32 below. An oil off take pipe 43 conducts the oil to the oil pipe line 10. It should be noted that the oil pipe line 10 is positioned at a height above gas chamber 34, thus insuring a proper level of oil in chamber 27.

Each chamber 27, 28, 29 and 30 is also provided with vertical baffle plates 44 (see Figs. 3, 4 and 5) causing the oil to travel in a zig-zag path from the oil inlet to the oil outlet.

The oil seal chambers 41 serve the purpose of a permanent oil seal in the hot absorber, even in the case where the gas flow is intermittent. As will be noted from Fig. 6, the construction of my hot absorber will insure that there is a level of oil in each chamber whether the apparatus is in use or not, and that the same may be used at any time when there is a gas supply on hand without first providing an oil supply in each of the chambers.

In the operation, tail gas or any other hydrocarbon gas which contains no hydrocarbon condensable or absorbable by the ordinary methods for the recovery of motor fuel, is preheated to about 300° F. and enters the hot absorber 2, where it is intimately mixed with lean oil which has been preheated up to 300 to 320° F. in the preheater 6. The gas enters the hot absorber 2, passes through chamber 34 upwardly through jet tubes 36 where it passes upwardly through reaction tubes 35. The gas may be under any suitable pressure above atmospheric to 500 pounds.

In passing through reaction tubes 35, the gas, by its injector like action, forms a jet or spray of oil thrown upwardly and intimately mixed with the gas. The gas acts as an absorbing medium and volatilizes or vaporizes a part of the light hydrocarbons of the oil and passes on through drop tubes 38, which, it should be noted, have their lower ends extending below the top of the reaction tubes 35 in order to prevent the gas from carrying over minute particles of the oil in suspension into the chambers 28 and 29, where the same reactions take place. The oil is successively passed from chambers 29, 28 and 27 downwardly to oil collecting chamber 32, the overflow pipes 40 and pipe 10 maintaining a predetermined level in the reaction chambers 30, 29, 28 and 27. The topmost reaction chamber 30 is not provided with any reaction tubes 35 but only with baffles 39, which are immersed in the oil, but extending above the jet tubes 36. The gas now charged or enriched with vapors of the oil is conducted through gas pipe 7 to a pre-cooler 8 where it is cooled to a temperature of from 50 to 90° F. and enters the cold absorber 9 where it is brought in contact with the oil of hot absorber 2, which, passing by means of pipe 10 to the heat exchangers 11, 12, and 13 to tank 14, is also cooled by means of cooler 8 to a temperature of from 50 to 90° F. which enters the cold absorber 9 to be intimately mixed with the gas. The construction of the cold absorber 9 is similar to the hot absorber 2, but it is not necessary to provide drop tubes 38 in chambers 27, 28, and 29. I provide baffle plates 39 immediately above each of the reaction tubes 35 or jet tubes 36 in chambers 27, 28, 29 and 30, since in the cold absorber 9 no distilling action takes place and it is desired merely to have an intimate mixture of the gas and the absorbing medium.

The reaction in the cold absorber 9 is reversed from that of hot absorber 2. In cold absorber 9 the oil acts as an absorbing medium and absorbs the vapors contained in the cooled gas and previously derived from the oil itself during its treatment in hot absorber 2, and also absorbs a part of the gas itself. It seems that the repeated intimate contact in both hot absorber 2 and cold absorber 9 is in the nature of a blending action as well as an absorbing action. The exhausted or stripped gas leaves the cold absorber 9 by pipe 17 to a storage tank or other places of consumption, while the oil which may now be termed fat oil, is led to fat oil tank 19, whence it passes by means of pipe 20 and pump 21 to the heat exchangers 13, 12 and 11, becoming preheated during its travel and thence to the still 23, where the oil is stripped of its motor fuel hydrocarbons which are led through pipe 24 to any suitable condenser, not shown. The lean oil, still hot from the still, is led by pipe 25 to the hot lean oil tank 3, ready to be used for the next cycle of operation.

It is thus seen that I have devised a process of continuous operation where the same oil is repeatedly used, being charged with motor fuel constituents absorbed in a cold absorber 9, of which it is stripped in the still 23 and returned to the starting point, the hot lean oil tank 3.

The motor fuel recovered is water white in color and appears to be of the same quality as the motor fuel in commerce. The yield will vary with conditions, depending on the quality of the lean gas as well as of the oil. I have obtained as much as 7 pints motor fuel from 1000 cu. ft. of lean gas. From tests I have made it appears that 6 pints are derived from the lean gas, while 1 pint is derived from the oil. The oil itself, it may be stated, does not appear to decrease in quantity; it seems that a certain quantity of the gas absorbed by the oil remains therewith and is not distilled off in the still.

The exact chemical reactions are rather obscure, but it seems certain that not only an absorbing, but also a blending action takes place in the hot absorber 2 and cold absorber 9, which produces a commercial stabilized gasoline.

It will be understood that the process is not limited to the apparatus shown and described, and that various changes may be made in the steps of the process by those skilled in the art without departing from the spirit of my invention, as claimed.

I claim:—

1. A process of distilling and blending hydrocarbons comprising causing a repeated intimate contact between a hot lean hydrocarbon gas and a hot absorbing medium containing hydrocarbons, cooling the gas and the absorbing medium and again causing a repeated intimate contact between the gas and the absorbing medium and distilling the absorbing medium to recover a commercial stabilized gasoline.

2. A process of distilling and blending hydrocarbons comprising causing a repeated intimate contact between a lean hydrocarbon gas and an absorbing medium containing hydrocarbons, each heated to a temperature of approximately 300° F., cooling the gas and the absorbing medium and again causing a repeated intimate contact between the gas and the absorbing medium and distilling the absorbing medium to recover a commercial stabilized gasoline.

3. A process of distilling and blending hydrocarbons comprising causing a repeated intimate contact between a hot lean hydrocarbon gas and a hot absorbing medium containing hydrocarbons by passing them in opposite directions successively in a series of chambers, cooling the gas and the absorbing medium and again causing a repeated intimate contact between the gas and the absorbing medium by passing them in opposite directions through a series of chambers and distilling the absorbing medium to recover a commercial stabilized gasoline.

4. A process of distilling and blending hydrocarbons comprising causing a repeated intimate contact between a lean hydrocarbon gas and an absorbing medium containing hydrocarbons, each heated to a temperature of approximately 300° F., by passing them in opposite directions successively in a series of chambers, cooling the gas and the absorbing medium to about 50 to 90° F. and again causing a repeated intimate contact between the gas and the absorbing medium by passing them in opposite directions through a series of chambers and distilling the absorbing medium to recover a commercial stabilized gasoline.

In testimony whereof I have signed my name to this specification.

JULIUS E. KOBERNIK.